United States Patent [19]

Rall

[11] Patent Number: 4,971,340
[45] Date of Patent: Nov. 20, 1990

[54] COLLET

[76] Inventor: Gerhard Rall, Sommerhalde 72, 7142 Marbach, Fed. Rep. of Germany

[21] Appl. No.: 361,915

[22] Filed: Jun. 6, 1989

[30] Foreign Application Priority Data

Jun. 7, 1988 [DE] Fed. Rep. of Germany ....... 3819407

[51] Int. Cl.⁵ ............................................. B23B 31/20
[52] U.S. Cl. ..................................... 279/57; 279/41 R; 279/49
[58] Field of Search .................... 409/234; 408/239 A, 408/238; 279/46 R, 49, 51, 54, 55, 58, 59, 57, 41 R, 56

[56] References Cited

U.S. PATENT DOCUMENTS

| 4,214,766 | 7/1980 | Rall | 279/54 |
| 4,640,517 | 2/1987 | Lovatt | 279/56 |
| 4,856,797 | 8/1989 | Rall | 279/41 R |
| 4,858,938 | 8/1989 | Terwilliger | 279/57 |

FOREIGN PATENT DOCUMENTS

| 658052 | 2/1963 | Canada | 279/55 |
| 2732677 | 1/1979 | Fed. Rep. of Germany . | |
| 1371605 | 7/1964 | France . | |
| 6516460 | 6/1966 | Netherlands | 279/55 |

Primary Examiner—William Briggs
Attorney, Agent, or Firm—Foley & Lardner, Schwartz, Jeffery, Schwaab, Mack, Blumenthal & Evans

[57] ABSTRACT

The collect (20) is composed of a foundation body (21) and a closer (22). The foundation body (21) can be connected to the tightening device of a machine tool. The closer (22) is divided into individual clamping jaws (38) which are connected to one another permanently by means of intermediate members made of a rubber-elastic compound. The foundation body (21) and the closer (22) are coupled to one another by means of a coupling device (24) which is positive in the axial direction and nonpositive in the radial direction. The coupling device (24) includes projections (42) arranged ont he closer part (22) and protruding radially outwards and a matching number of openings (48) on the foundtion body (21).

5 Claims, 5 Drawing Sheets

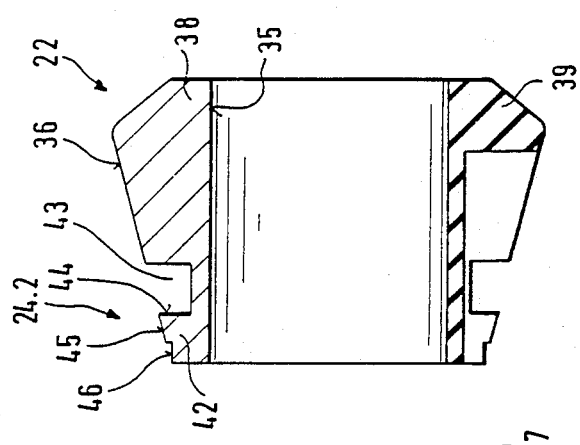
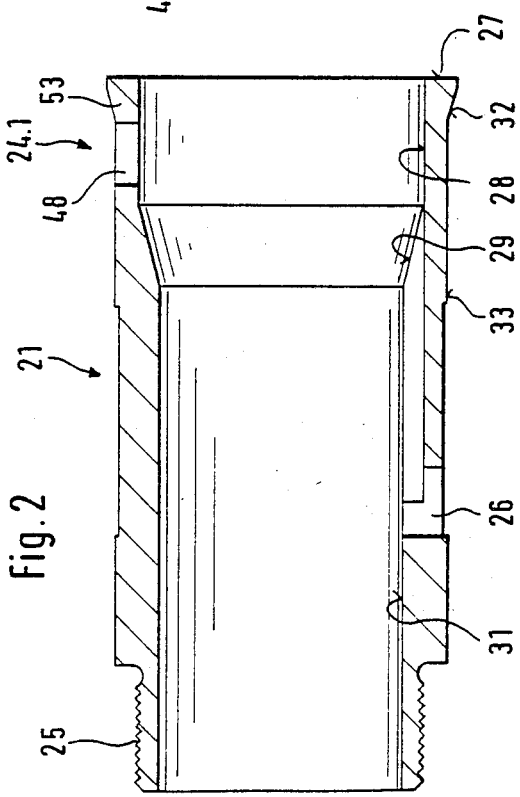

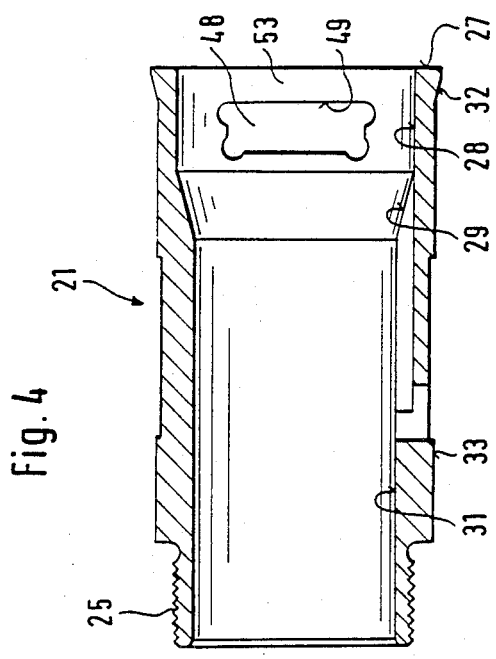
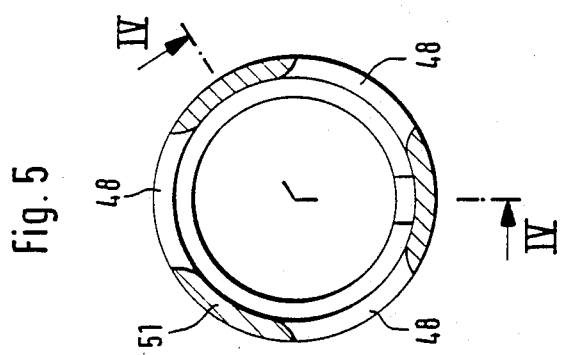

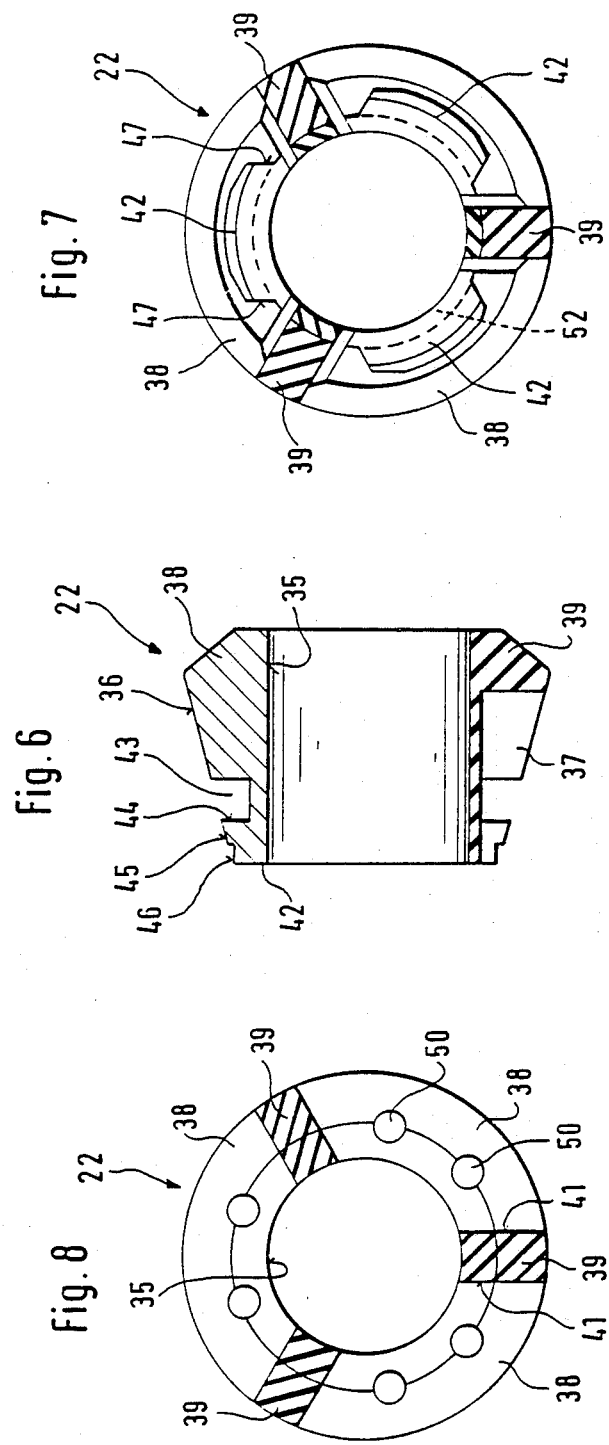

COLLET

BACKGROUND OF THE INVENTION

In the cylindrical workpieces on lathes, collets are frequently used to chuck the workpieces. This is even more so in the case of the working of bar stock on semiautomatic or fully automatic single-spindle or double-spindle lathes. In the case of a large number of these lathes, the collets are closed by means of a tightening device. In the case of collets produced in one piece, it is possible to distinguish between a closer part and a draw-in tube part. On its inside, the closer part has clamping surfaces for the workpieces and on its outside has an external cone which widens towards the free end face. The closer part is divided into individual clamping jaws by longitudinal slots arranged distributed over the periphery. These longitudinal slots are through slots in the radial direction and extend in the axial direction from the free end face of the closer part to a longitudinal portion which remains unslotted and forms the actual draw-in tube part. At the end of this draw-in tube part there is a securing thread for securing the collet on the tightening device of the lathe. The central longitudinal portion situated between the actual closer part and the actual draw-in tube part is divided by the longitudinal slots into individual tongues by means of which the clamping jaws adjoining at the forward end can spring inwards and outwards in the radial direction relative to the draw-in tube part. In the lathe, the external cone of the closer part rests against a matching internal cone of the work spindle of the lathe.

During the closing or tightening movement, the clamping jaws situated at the forward end of the tongues move on an arcuate movement path and in the process execute a swivelling movement. If a workpiece does not have exactly the nominal diameter but is overdimensioned or underdimensioned, it is gripped and chucked only by the rearward or by the forward end of the clamping surfaces, i.e. only over a relatively small longitudinal portion. The bending moment produced as a result at the clamping jaws is generally not capable of deforming the tongue elastically to such an extent that the clamping surfaces of the clamping jaws come to rest over a larger longitudinal portion or even over their entire length against the workpiece. As a result, there is the risk that the workpiece will avoid the cutting forces and execute wobbling movements, leading to a poor machining result. To reduce this risk, the collets of a collet set must be very narrowly stepped, resulting in a large number of collets and correspondingly high costs for a collet set. In addition, these circumstances make it necessary to pay attention to small diameter tolerances in the workpieces and, for example, in the working of bar stock to do without the cheaper rolling material and instead use more expensive drawn or bright-turned bars.

A certain remedy, specifically with respect to the tilting of the clamping jaws, is achieved in a collet (French Patent No. 1,371,605) in which the closer part and the draw-in tube part are separate from one another and are coupled to one another by means of a coupling device. For this purpose, a circumferential groove is present either in the outer circumferential surface of the draw-in tube part or in the inner wall surface of the closer part and an inward- or outward-protruding collar matched to this groove is present on the counterpart. Because of the longitudinal slots, this collar is divided at the clamping jaws of the closer part into individual arcuate claws. At the draw-in tube part, the axial tensile force for chucking a workpiece is introduced via the neck, situated in the same radial plane as the groove, into the adjoining collar-shaped longitudinal portion, transmitted by the end face of the latter, which end face faces the claws, to said claws and transmitted in turn by the claws into the clamping jaws via the neck, which is situated in the same radial plane as the collar on the draw-in tube part. Over the entire chucking capacity of the collet, i.e. even in the case of a clamping diameter which is smaller relative to its nominal diameter, a certain safety clearance must be present between the cylindrical inside surface of the claws and the groove base on the draw-in tube part in order to be able to bridge production tolerances, inclusions of foreign bodies, rounding radii in the groove base with a view to eliminating the notch effect, and the like, without bottoming. This safety clearance and the difference in the radius of the desired chucking capacity must be subtracted from the radial dimension of the annular cross-sectional area between the penetration orifice in the neck of the draw-in tube part and the circumferential surface at the clamping jaws in the radial plane of the collar on the draw-in tube part. In the case of the two neck surfaces, account must be taken of the fact that, although the penetration depth of the case-hardening necessary for the contact surfaces provides a high wear resistance, it does not provide high tensile strength. In addition, the stress increase as a result of the notch effect due to the abrupt changes in cross-section at the transition from the neck to the adjoining collar and to the claws must be taken into account. The available radius region must therefore be divided in such a way that only a relatively small radius region is available for the contact surfaces and only a very small radial relative movement and hence only a very small chucking capacity can be permitted. In addition, for reasons of strength, the axial loading of the coupling device must be limited.

In another known collet disclosed in U.S. Pat. No. 4,214,766 (German Patent No. 2,732,677), these difficulties were reduced by the fact that axial extensions, arranged distributed in the circumferential direction and engaging claw-fashion in one another in the axial direction, and recesses situated between said extensions are present at the mutually facing ends of the closer part and of the draw-in tube part, that a circumferential groove is in each case present on the closer part and on the draw-in tube part in the region of the axial extensions and that a coupling ring is inserted into said groove. This coupling ring is divided at two diametrically opposite locations on the circumference. At in each case one of the two adjacent ends, the coupling ring is swivel-mounted on the draw-in tube part by means of a swivel joint having a swivelling axis oriented parallel to the longitudinal axis of the collet. At the other end of the two coupling ring halves is a position-securing device for the coupling ring halves which is formed principally by a locking pin which, in the clamping position of the coupling ring halves is pushed into mutually aligned bores at the end of each coupling ring half and at the closer part. In this coupling device, the radius difference remaining after subtraction of only one safety clearance and of the radial chucking capacity has to be divided over only two force-transmission points, namely over the end-face contact surface between the coupling ring and the groove in the axial extensions of the collet parts and over the neck surface of these extensions. However, these advantages are achieved at the expense of the fact that, to exchange the closer part for another clamping diameter, the entire collet must be pushed at least far enough out of the work spindle of the lathe for the position-securing device of the coupling ring halves to be freely accessible, and to enable the two coupling ring halves, after the release of the position-securing device, to be swivelled out of the circumferential groove of the extensions engaging in one another claw-fashion. In the case of an exchange of the clamping diameter, this requires a relatively large displacement path for the collet and furthermore requires relatively involved handling of the parts of the coupling device between the draw-in tube part and the closer part. In addition, for this purpose there must be sufficient space for the movement of the coupling ring halves in the vicinity of the work spindle, both in the axial direction and in the radial direction, but this space is frequently lacking especially in the case of multi-spindle automatic lathes.

SUMMARY OF THE INVENTION

It is an object of the invention to design a collet dividable into a closer part and draw-in tube part or, in other words, into a foundation body and closer, in such a way that the exchange of the closer is relatively easy and that the transmissible chucking forces are as large as possible and that, when the coupling device between the closer and the foundation body is loaded, the stresses on the parts are relatively small.

By virtue of the fact that the closer and the foundation body are coupled to one another in such a way that the projections on the closer engage in the openings on the foundation body and that, in the process, the coupling surfaces in the form of the end wall of the projections and of the forward end wall of the openings lie in the radius region of the foundation body, the radius region remaining for the transmission of the coupling forces after subtraction of a safety clearance and of the radial chucking capacity must, in cross-section, only be divided over two web surfaces. This results in a lower stressing of these parts for the same loading. Conversely, for the same stressing of the parts, the coupling device can be subjected to a higher load than is possible in the case of the collet initially described. By virtue of the fact that the closer is coupled to the foundation body by the clamping jaws being tilted radially inwards relative to one another with their rearward ends, with elastic deformation of the elastic means between the clamping jaws, and the projections then simply being hooked into the openings or, conversely, unhooked from them, a closer exchange is very simple and rapid, at all events considerably more simple and more rapid than in the case of the collet described second, which with regard to the stressing of the parts of the coupling device is comparable to the present collet.

Another feature of the collet in the projections of the coupling device are produced in a relatively simple manner, with the result that the costs for the collet are correspondingly low. By virtue of the fact that the outer spacing of the longitudinal walls of the projection is selected to be smaller than the circumferential extent of the clamping jaw, the openings can be correspondingly shortened in the circumferential direction. As a result, the stresses on the parts of the coupling device can be even further matched to one another.

Another feature of the collet is that the smallest possible tilt angle for the clamping jaws during closer exchange is achieved and, in addition, the introduction of the projections into the interior of the foundation body is facilitated.

By virtue of a design of the collet it is achieved that the elastic deformation of the coupling part of the closer which unavoidably occurs when the coupling device is loaded is compensated, and that the actual contact surface of the coupling surfaces is situated within the vertical projection of the two coupling surfaces, if possible even in the central region of this vertical projection, and edge-to-edge contact of the two parts is avoided. Local overstressing of the parts is thereby avoided, with the result that the loadability of the coupling device is considerably increased by this means also.

The invention is explained in greater detail below with reference to an exemplary embodiment illustrated in the application drawings:

BRIEF DESCRIPTION OF THE APPLICATION DRAWINGS

FIGS. 2 and 3 show a longitudinal section of the foundation body and of the closer, respectively, in the uncoupled condition;

FIG. 4 shows a longitudinal section of the foundation body alone, in accordance with the line IV—IV in FIG. 5;

FIG. 5 shows a cross-section of the foundation body in accordance with the line V—V in FIG. 4;

FIG. 6 shows a longitudinal section of the closer;

FIG. 7 shows an end view of the closer, viewed from the rearward end;

FIG. 8 shows an end view of the closer, viewed from the forward end;

DETAILED DESCRIPTION OF THE PREFERRED EMBODIMENT

Figure 1:
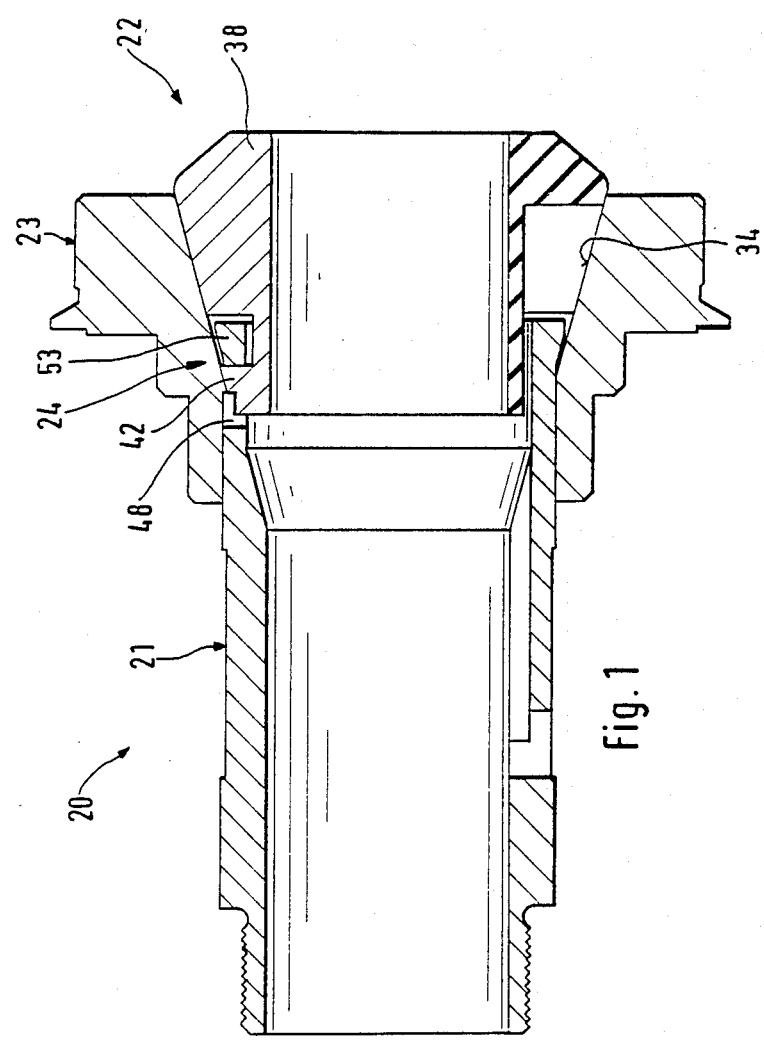
FIG. 1 shows a longitudinal section of the collet in the coupled condition of its foundation body and its closer.

The collet 20 has a foundation body 21 and a closer 22. The collet 20 is illustrated inserted in a collet holder 23 of the work spindle a lathe (sic), and is in the clamped condition. The foundation body 21 and the closer 22 are two independent parts which can be separated from one another (FIGS. 2 and 3). In the operating condition, they are coupled to one another by means of a coupling device 24 which is positive in the axial direction and nonpositive in the radial direction.

The foundation body 21 is a tubular part. At its rearward end, it is provided with a securing thread 25 in the form of an external thread by means of which the foundation body 21 can be secured on the tightening device of the lathe. In order to facilitate the screwing of the foundation body 21 into the tightening device, it has in its wall at least one radially oriented through hole 26 at which a tool can be applied. In the forward end region of the foundation body 21 is arranged the coupling part 24.1 of the foundation body. This coupling part includes, on the inside of the foundation body 21, a circular and cylindrical widening 28 which starts from the free end with the end face 27 and is adjoined by a frustoconical transition surface 29. From here, the circular cylindrical inner surface 31 of the foundation body 21 extends as far as the rearward end. On the outside, the end face 27 is adjoined by an external conical surface 32 which tapers to the circular cylindrical outer surface 33 of the foundation body 21. At the rearward end region, the outer surface 33 is stepped towards the securing thread 25. The cone angle of the external conical surface 32 is matched to the cone angle of the internal conical surface 34 of the collet holder 23 (FIG. 1). In the axial direction, the external conical surface 32 is arranged in such a way on the foundation body 21 that it does not touch the internal conical surface 34 of the collet holder 23 even when the entire collet 20 has been drawn as far as its rearwardmost operating position into the collet holder 23.

From FIG. 3 and from FIGS. 6 to 8 it can be seen that the closer 22 has approximately the form of a hollow truncated cone. On its inside, it has clamping faces 35 for the workpieces to be chucked. On its outside, the closer 22 has an external cone 36 widening towards its forward end, said cone being matched to the internal cone 34 of the collet holder 23.

The closer 22 is divided into individual clamping jaws 38 by longitudinal slots 37 which pass through in both the radial and in the axial direction. The gaps produced by the longitudinal slots 37 between the individual clamping jaws 38 are filled to a certain extent by a rubber-elastic compound 39. The rubber-elastic compound 39 is introduced in a flowable condition into the gaps between the clamping jaws 38 inserted into a casting mold, and converted by heat treatment into a solid condition in which they are firmly bonded to the mutually facing wall surfaces 41 of the clamping jaws 38. The clamping jaws 38 are thus united to form the closer 22 by means of the rubber-elastic compound 39.

As can be seen from FIGS. 1, 3, 6 and 7, that part of the coupling device 24 which is connected to the closer 22, the coupling part 24.2, has a projection 42 protruding radially outwards on each clamping jaw 38. These projections 42 result from the fact that a circumferential groove 43, by virtue of which, in front of the projections 42, a recess curved circumferentially in the form of a circular arc is present in the individual clamping jaws 38, has been made on the outside on the closer 22 in the relevant longitudinal portion. That side wall of the circumferential groove 43 which is situated nearer the rearward end of the closer 22 is designed as a planar annular surface which is oriented normal to the longitudinal axis of the closer 22. The end face 44 thereby formed of the projections 42, which end face faces away from the foundation body 21, forms the coupling surface of the coupling device 24 on the closer. By reason of said method of producing the projections 42, the end face 44 lies in the same plane normal to the longitudinal axis in the case of all the clamping jaws 38.

As can be seen from FIGS. 1, 3 and 6, the circumferential groove 43 on the closer 22 lies within the longitudinal portion over which the external conical surface 36 extends, with the result that the top side 45 of the projections 42, as a portion of a frustoconical surface, follows a curved course in the circumferential direction. In addition, like the external conical surface 36 aligned with it, this top side 45 rests against the internal conical surface 34 of the collet holder 23 and contributes at the rearward end region of the clamping jaws 38 to their clamping force. At the rearwardmost end of the closer 22, adjoining the projections 42, there is a short circular cylindrical centering or clamping surface 46 via which the closer can be chucked at its rearward end during its production, before it is divided into the individual clamping jaws 38.

As can be seen FIG. 7, the projections 42 have a smaller circumferential extent than the clamping jaws 38. The two longitudinal walls 47 of the projections 42, said walls extending in the longitudinal direction of the closer 22, are oriented parallel to one another and arranged symmetrically to the bisecting line of the associated clamping jaw 38.

As can be seen from FIGS. 1, 2, 4 and 5, that part of the coupling device 24 which is arranged on the foundation body 21, coupling part 24.1, is formed by openings 48 which are made in the forward longitudinal portion of the foundation body 21, more precisely in the region of the widening 28. The number of openings 48 is equal to the number of clamping jaws 38 on the closer 22. In the circumferential direction, the openings 48 are arranged distributed in the same manner as the clamping jaws 38. The circumferential extent of the openings 48 is somewhat greater than the circumferential extent of the projections 42. The axial extent of the openings 48 is likewise somewhat greater than the axial extent of the projections 42, including the adjoining circular cylindrical clamping surface 46.

In the case of all the openings, that end wall 49 of the openings 48 which is nearest the closer 22 and therefore faces away from it is at least approximately situated in the same plane normal to the longitudinal axis of the foundation body 21. The end wall 49 is in the form of a portion of a planar annular surface. It forms the coupling surface of the coupling part 24.1 on the foundation body.

As can be seen from FIG. 5, the circumferential extent of the openings 48 is chosen at least approximately so that the webs 51 remaining between them in the circumferential direction have at least approximately the same cross-sectional area as the webs 52 (FIG. 7) between the projections 42 and the remaining part of the clamping jaws 38 in order to ensure that, taking into account the strength properties of the material of the foundation body 21 and of the closer 22, the webs 51 and 52 can be loaded to at least approximately the same degree within the permissible material stressing.

Figure 9:
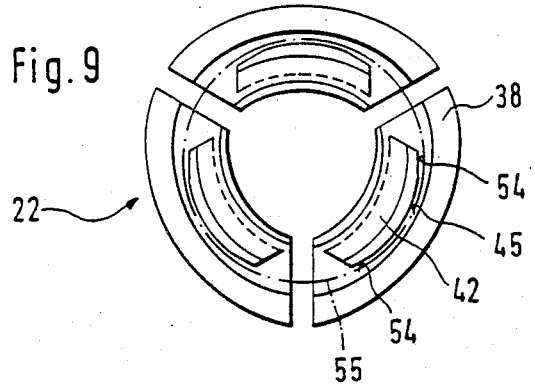
FIG. 9 shows an end view of the closer in the relative position for the coupling procedure.

As can be seen from FIG. 1, in the coupling position of the collet 20, the clamping jaws 38 of the closer 22 rest uniformly against the internal conical surface 34 of the collet holder 23, the projections 42 of the clamping jaws 38 engaging more or less far into the openings 48 of the foundation body 21. In order to achieve this coupling condition, the clamping jaws 38 must be tilted radially inwards, at least with their rearward end, sufficiently far to allow the projections 42 to be moved through under the yoke part 53 of the foundation body 21 between the openings 48 and the free end. For this purpose it is expedient that the top side 45 of the projections 42 should be set back relative to the external conical surface of the top side 45 at least in the two lateral regions 54 (FIG. 9) situated furthest away from the plane of symmetry of the clamping jaws 38, in particular in a manner and to an extent such that the lateral regions 54 and the remaining part of the top side 45 are within a circular line 45, the chain-dotted line marked in FIG. 9, when the clamping jaws 38 have been tilted inwards at their rearward end. The circular line 55 represents the vertical projection of the widening 28 of the foundation body 21.

From FIG. 5 it is possible to see the coupling device 56, which is slightly modified compared to coupling device 24. The modification consists in the fact that in the case of the openings 58 on the foundation body 57 the forward end wall 59 has a convex curvature in longitudinal section. In the region of the outer edge 61, the surface normal of the end wall 59 is oriented approximately parallel to the longitudinal axis of the foundation body 57 and, in the region of the inside edge 62, is inclined relative to the longitudinal axis by a maximum angle of inclination. The curvature of the end wall 59 is shown exaggeratedly large in FIG. 10. In reality, it is chosen so that the surface normal halfway up the end wall 59 has an angle of inclination relative to the longitudinal axis of the closer 57 which is at least approximately equal to the angle of the elastic deformation or tilting of the end wall 63 of the projection 64 of the clamping jaw 65 when the projection 64 is loaded with the maximum coupling force and during this procedure the web 66 between the projection 64 and the clamping jaw 65 bends elastically. As a result, at full loading of the coupling device 56, the actual contact surface between the end wall 59 and the end wall 63 is shifted into the central region, while at lower loading, it is situated more in a direction towards the outside edge 61. Edge-to-edge contact of the two end walls 59 and 63 in the region of the inside edge 62 is thereby avoided.

Figure 11:
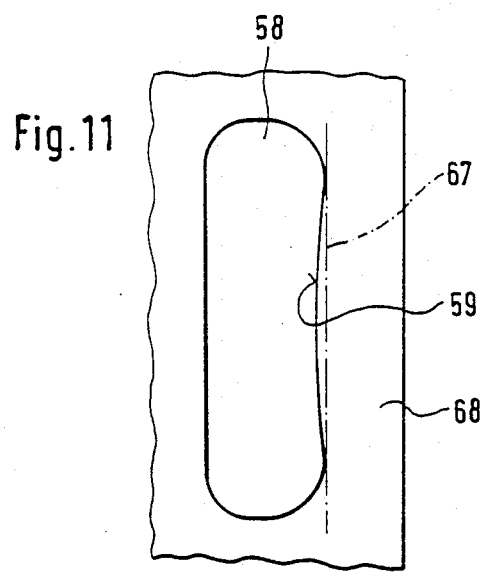
FIG. 11 shows a planar development, illustrated as a cut-out portion, of the coupling region of the foundation body.

An additional modification of the coupling device 56, having the same effect, can be seen from FIG. 11. Here, the horizontal projection of the end wall 59 of the opening 58, which is here illustrated simply as a rounded oblong, likewise has a convex curvature, in particular symmetrical to the circumferential extension of the opening 58. The arc height of this curvature is made greater than the arc height of the horizontal projection of a forward end wall which is straight in the unloaded condition and is indicated by the chain-dotted line 6 when the yoke part 68 deforms elastically, curving forwards, with this straight end wall 67 at maximum loading of the coupling device 56. The dimension of the arc height can be derived from a curvature of the end wall 67 if a uniform loading of the yoke part 68 is assumed. It is more expedient, in accordance with the actual conditions, to assume a more or less lumped load of the yoke part 68 in the plane of symmetry.

Figure 10:
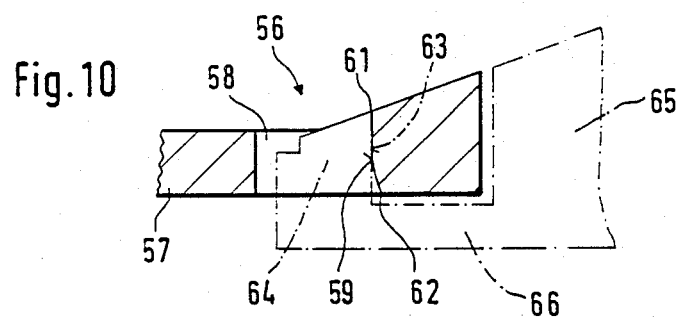
FIG. 10 shows a longitudinal section, illustrated as a cut-out portion, of the coupling region of the foundation body.

The curvature of the end wall 59 of the opening 58, said curvature being visible from FIG. 11, can equally well be provided at the end wall 63 of the projection 64 on the clamping jaw 65 and the end wall 59 can then be made flat at least in the longitudinal section according to FIG. 10. This curvature can be produced more easily during the turning of the groove for the end face 63 than during the milling of the opening 58 and the subsequent grinding of its end wall 59. The curvature illustrated in FIG. 11 of the end wall 59 in the horizontal projection is simpler to produce in the case of the foundation body 57.

I claim:
1. A collet comprising:
 (a) a foundation body and a closer which are separable from one another and which are adapted to be coupled to one another by means of a coupling device which is positive in the axial direction and is nonpositive in the radial direction,
 (b) said foundation body having a longitudinal axis and being formed with openings having a forward end wall at the end thereof facing said closer, and a securing thread at the end thereof facing away form the closer for securing the collet to a tightening device,
 (c) said closer having a longitudinal axis and being formed on its inside with clamping surfaces for workpieces, and on its outside with an external cone which is situated at least partially in the longitudinal portion of the clamping surfaces and which widens towards the free end face of said closer, said closer being divided into individual clamping jaws by longitudinal slots which pass through in the radial and axial direction,
 (d) elastic means positioned between the clamping jaws for holding the clamping jaws together as the closer, and wherein
 (e) a projection protrudes radially outwards on the outside of each clamping jaw on the end portion facing the foundation body, the end wall of the projection which faces away from the foundation body being oriented approximately parallel to a plane normal to the longitudinal axis of said closer, and
 (f) said opening formed in the foundation body at the end portion thereof facing the closer are equal in number to the number of clamping jaws on the closer, said openings being distributed in the circumferential direction in the same manner as the clamping jaws on the closer, the end walls of said openings facing away from the closer being situated in a plane approximately normal to the longitudinal axis of the foundation, the circumferential extent of said openings being at least as great as the circumferential extent of the projections on the clamping jaws, and the axial extent of said openings being at least as great as the axial extent of the projections on the clamping jaws.

2. The collet as claimed in claim 1, wherein said projection on such clamping jaw is formed adjacent a recess extending arcely in the circumferential direction on the outside of the jaw, the end walls of the projections are oriented separately parallel to one another and approximately parallel to the plane of symmetry of the clamping passing through the longitudinal axis of the closer arcuate spacing of the end walls of said projection smaller than the circumferential extent of the clamping.

3. The collet as claimed in claim 1, wherein, in relation to the plane of symmetry of the clamping jaw, a top side of section follows a curved course in the circumference direction of the closer, the radius of curvature top side of the projection being smaller than of the top side, measured in the plant of symmetry, from the longitudinal axis of the closer, and at least approximately equal to half the inside diameter of said foundation body in the longitudinal portion between the openings in the foundation body and the adjacent free end thereof.

4. The collet as claimed in claim 1, wherein one of said end wall of the projection on the clamping jaw and the forward end wall of the opening on the foundation body has a convex curvature in longitudinal section, the surface normal to such end wall approximately intermediate the height thereof having an angle of inclination which is approximately equal to the angle of the elastic deformation of the end wall on the clamping jaw at maximum loading of the coupling device.

5. The collet as claimed in claim 1, wherein one of said end walls of the projection on the clamping jaw and the forward end wall of the opening on the foundation body has, in the planar developed view, a horizontal projection having a convex curvature, the arc height of this curvature being at least equal to the arc height of the horizontal projection of a straight forward end wall of the foundation body openings which the latter experiences at maximum loading of the coupling device in the case of loading in the middle of the end wall, or at least in the case of loading of the end wall distributed uniformly over the entire end wall.

* * * * *